United States Patent Office 2,889,159
Patented June 2, 1959

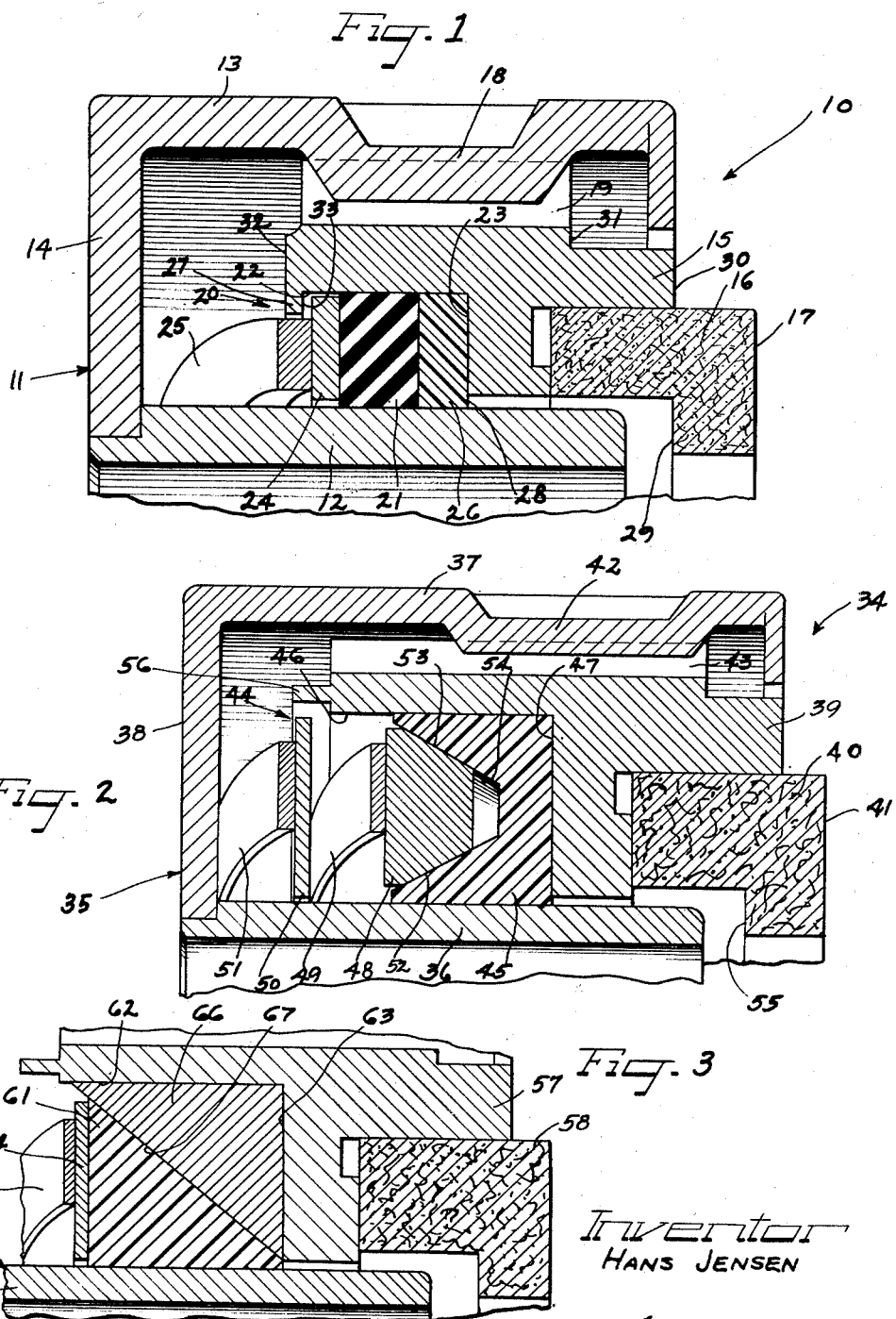

2,889,159
SHAFT SEAL

Hans Jensen, Wheeling, Ill., assignor to Gits Bros. Mfg. Co., Chicago, Ill., a corporation of Illinois Application November 1, 1955, Serial No. 544,160

7 Claims. (Cl. 286—11.14)

This invention relates to a shaft seal or the like for effecting a seal between a rotatable element and a stationary wall element or the like to prevent communication between the spaces on opposite sides of the wall element.

In such a seal, a support member may be carried by one of the elements with a ring carried by the support member and with means on the ring defining a sealing face arranged to coact with a sealing face on the other of the elements. To provide for relative axial movement of the elements and to compensate for wear of the sealing faces, it is necessary to permit relative axial movement between the ring and the support member and also it is necessary to maintain a seal between the ring and the support member. It is also very desirable that the seal assembly be operative with the fluid pressure on either side of the wall element being greater than the fluid pressure on the opposite side. In addition, the seal assembly should be operative with fluids of high temperature and pressure.

An object of this invention is to provide an improved shaft seal or the like incorporating improved means for providing a seal between a support member and a ring which is axially movable relative to the support member.

Another object of this invention is to provide a seal assembly for effecting a seal between a rotatable element and a stationary wall element or the like so as to prevent communication between spaces on opposite sides of the wall element, with the assembly being efficient in operation with a greater fluid pressure on either side of the wall element relative to the pressure on the opposite side.

A further object of this invention is to provide improved shaft seals which are readily and economically manufactured and assembled and efficient and reliable in operation.

According to an important feature of this invention, a sealing washer of resilient material is utilized to effect a seal between a support member and a ring axially movable relative to the support member, and means are provided for exerting a wedging action on the sealing washer to tightly engage the same with the support member and the ring.

Another feature of this invention is in the provision of a shaft seal having a packing assembly arranged to respond to axial loading to provide a seal between a support member and a ring axially movable relative to the support member in which the ring and the packing assembly have faces exposed to fluid in the spaces on both sides of a wall element, the arrangement being such that an increase in the pressure on either side of the wall element does not result in any substantial decrease in the force acting to urge the sealing faces of the seal together.

A further feature of the invention is in the provision of a shaft seal in which a washer of resilient material is confined between facing surfaces of a ring and a rigid washer with means provided to urge the facing surfaces together to exert squeezing forces on the resilient washer and with means to limit movement of the rigid washer relative to the ring. With such an arrangement, the assembly can operate irrespective of the direction and magnitude of fluid pressures applied thereto.

This invention contemplates other objects, features and advantages which will become more fully apparent from the following detailed description taken in conjunction with the accompanying drawings which illustrate preferred embodiments and in which:

Figure 1 is a cross-sectional view through a portion of a shaft seal constructed according to the principles of this invention;

Figure 2 is a sectional view through a portion of a modified form of shaft seal constructed according to the principles of this invention; and Figure 3 is a sectional view through a portion of still another modified form of shaft seal constructed according to the principles of this invention.

Reference numeral 10 generally designates one preferred form of shaft seal constructed according to the principles of this invention. In the seal 10, an annular cartridge-like support member 11 is provided which is arranged to be secured on a shaft or within an opening in a wall or the like through which a shaft extends. The support member 11 comprises inner and outer cylindrical walls 12 and 13 and an annular radially extending wall 14 between adjacent ends of the cylindrical walls 12 and 13. A support ring 15 is disposed within the support member 11, between the walls 12 and 13, and carries a sealing ring 16 having an annular sealing face 17. With the member 11 supported within a wall, the sealing face 17 may engage a like sealing face carried by a rotatable shaft, or with the member 11 disposed on a shaft, the sealing face 17 may engage a like sealing face carried by a wall element or the like.

The support ring 15 and sealing ring 16 carried thereby are movable axially within the support member 11 to compensate for wear of the sealing face 17, to permit relative motion of elements, etc. To prevent or limit rotation of the support ring 15 relative to the support member 11, the outer cylindrical wall 13 is inwardly deformed at circumferentially spaced points to provide ridges 18 engaged in grooves 19 in the support ring 15.

It is also necessary to provide a seal between the support ring 15 and the support member 11 and for this purpose, a packing assembly 20 is provided. The packing assembly 20 comprises a washer 21 of a flexible resilient material such as natural or synthetic rubber or the equivalent, which is disposed between the outer cylindrical surface of the wall 12 and an inner cylindrical surface 22 of the support ring 15, the washer 21 being also disposed between a radially extending annular surface 23 of the ring 15 and a washer 24 of metal or other relatively rigid material. A flat wave compression spring 25 between the wall 14 and the washer 24 acts to exert squeezing forces on the washer 21 to increase the pressure between the washer 21, the surface 22 and the wall 12, the compression spring 25 also acting to urge the main sealing face 17 into engagement with a like face.

An important feature of the shaft seal 10 is in the provision of an insulating ring or washer 26 of a material capable of withstanding the combined effects of the fluid sealed and the temperatures applied, the washer 26 being disposed between the rubber washer 21 and the surface 23. The washer 26 is preferably of polytetrafluoroethylene (referred to in the trade as Teflon), or may be of any heat-resistant elastomer such as silicone or other refractory elastomers. Such materials are not generally as resilient as rubber and hence the combination provides a seal which is highly efficient and yet can withstand the combined effects of the fluid sealed and the high temperatures applied.

In accordance with other important features of the invention, the seal 10 is so constructed that it is efficiently operable irrespective of the relative fluid pressures in the spaces on opposite sides of the seal, i.e., the spaces between which the seal acts. In particular, an annular projection on the ring 15 is clinched over to provide a radially inwardly projecting annular flange 27 which limits movement of the washer 24, the purpose being to prevent the packing assembly 20 from being blown apart with high pressures on one side of the seal. The fluid on one side of the seal acts on a surface portion 28 of the washer 26 to develop a force urging the washer 26 away from the surface 23. This force is opposed by the force exerted by the spring 25 and the force exerted by the fluid pressure on the opposite side of the seal against the washer 24 and exposed surface portions of the washer 21. If the force exerted on the surface portion 28 is too great with respect to the opposing forces, the washer 26 will be moved away from the surface 23 to provide a much greater area for the fluid to act upon, with the result that the packing assembly could be blown apart.

However, by providing the flange 27, movement of the washer 24 is stopped and the force exerted by the fluid under pressure against the washer 26 will squeeze the washer 21 between the washers 24, 26 to maintain the seal.

In accordance with this invention, sufficient pressure is maintained between the sealing face 17 and the surface with which the same is engaged to maintain a seal irrespective of the relative fluid pressures in the spaces on opposite sides of the seal.

In particular, the fluid under pressure on one side of the seal acts against the surface 28 of the washer 26 to produce a force urging the sealing face 17 away from the surface with which it is engaged. The sealing ring 16 is preferably formed to provide a surface 29 facing in a direction opposite the surface 28 so that fluid under pressure against the surface 29 will develop a force urging the sealing face 17 into higher pressure engagement with the surface with which it is engaged. The surface 29 is preferably substantially greater in area than the surface portion 28 so that an increase in the fluid pressure on the one side of the seal will increase the pressure at the sealing face 17.

The fluid in the space on the opposite side of the seal acts against surface portions 30, 31, 32 and 33 of the ring 15 and also against the surface of the washer 24 and exposed surface portions of the resilient washer 21. The forces developed by pressure against the surface portions 30, 31 and 33 urge the sealing face 17 away from a surface with which it is engaged, while the forces developed by pressure against the surface 32, the surface of the washer 24 and exposed surfaces of the washer 21 urge the ring 15 in a direction to increase the pressure at the sealing face 17. It is desirable that the pressure at the sealing face 17 be increased with increases in fluid pressure and hence the combined area of the surface portion 32, the surface of the washer 24 and the exposed surface portions of the washer 21 is preferably substantially greater than the combined area of the surface portions 30, 31 and 33. With the compression spring 25 acting to increase the pressure at the sealing face 17, this relation of the areas would not be absolutely necessary, but it is still very desirable.

It may be noted that if the washer 26 is moved away from the surface 23 to engage the washer 24 with the flange 27, the pressure exerted at the sealing face 17 will not be substantially affected, because the pressure exerted against the washer 26 will be substantially offset by the pressure exerted against the surface 23.

Referring now to Figure 2, reference numeral 34 generally designates another preferred form of seal constructed according to the principles of this invention. The seal 34 comprises an annular cartridge-like support member 35 similar to the support member 11 of the seal 10, which comprises inner and outer cylindrical walls 36 and 37 with an annular radially extending wall 38 between adjacent ends of the cylindrical walls 36 and 37. A support ring 39 (similar to the ring 15 of the seal 10) is disposed within the support member 35 between the walls 36 and 37 and carries a sealing ring 40 having an annular sealing face 41. With the member 35 supported within a wall, the sealing face 41 may engage a like sealing face. By a rotatable shaft, or with the member 35 disposed on a shaft, the sealing face 41 may engage a like sealing face carried by a wall element or the like through which the shaft extends.

The support ring 39 and sealing ring 40 carried thereby are movable axially within the support member 35 to compensate for wear of the sealing face 41, to permit great tolerances in the installation of the seal assembly, etc. To prevent or limit rotation of the support ring 39 relative to the member 35, the outer cylindrical wall 37 is inwardly deformed at circumferentially spaced points to provide ridges 42 which are engaged in grooves 43 in the support ring 39.

An important feature of the seal 34 is in the construction of a packing assembly 44 which provides a seal between the support ring 39 and the support member 35. The packing assembly 44 comprises a washer 45 disposed between the outer cylindrical surface of the wall 36 and an inner cylindrical surface 46 of the support ring 39. The washer 45 is also disposed between a radially extending annular surface 47 of the support ring 39 and a washer 48 of metal or other relatively rigid material. The washer 48 is urged toward the surface 47 by compression spring means which may comprise a flat wave compression spring 49 between the washer 48 and a rigid washer 50 and a second flat wave compression spring 51 between the washer 50 and the wall 38, the purpose of using two compression spring members being to prevent greater degrees of movement.

The washer 48 cooperates with the surface 47 to exert squeezing forces on the washer 45 to provide increased pressure engagement between the washer 45, the wall 36 and the surface 46. In addition, means are provided for exerting a wedging action on the washer 45 to tightly engage the same with the wall 36 and the surface 46. To provide this wedging action, the surface 46 and the surface of the wall 36 should be convergently related either to each other or at least one of such surfaces should be convergently related to a surface of the washer 48. Preferably, the washer 48 is provided with radially inwardly and outwardly facing generally frusto-conical surfaces 52 and 53 which are respectively in convergent relation to the outer surface of the wall 36 and the surface 46, so as to exert wedging action on two separate portions of the washer 45. The washer 45 is preferably preformed with a groove 54 so as to provide surfaces complementary to the surfaces 52, 53, the washer 45 thereby having a generally chevron-shaped cross-section.

By virtue of the wedging action achieved in the packing assembly 44, it is not necessarily required that the washer 45 be of a highly resilient material and it is possible to use heat-resistant elastomers such as silicone elastomers or preferably polytetrafluoroethylene, particularly in high temperature applications where such materials become more resilient.

It may be noted that the sealing ring 40 is provided with a surface portion 55 similar to the surface portion 29 of the ring 16, and the seal assembly 34 is otherwise constructed in a manner similar to the assembly 10, so as to be efficiently operable irrespective of the relative fluid pressures in the spaces on opposite sides of the seal. The seal 34 as illustrated is designed for applications in which the pressure, at maximum, would not be sufficient to blow the packing assembly 44 apart. For higher pressures, an annular projection 56 on the ring 39 may be turned radially inwardly so as to provide a flange limiting movement of the washer 48 away from the surface 47.

Figure 3 illustrates a modified manner of obtaining the wetting action on the washer of the packing assembly. Referring thereto, reference numeral 57 designates a support ring which may be identical to the support ring 39 and may carry a sealing ring 58 identical to the sealing ring 40, and the ring 57 may be mounted within a support member 59 including a wall 60 identical to the wall 36.

A resilient washer 61 is disposed between the wall 60 and an inner cylindrical surface 62 of the ring 57, and also between an annular radially extending surface 63 of the ring 57 and a rigid washer 64 urged toward the surface 63 by a compression spring 65. A member 66 is provided which engages the surfaces 62 and 63 and has a generally frusto-conical surface 67 convergently related to the outer surface of the wall 60. With this arrangement, a wedging action is exerted on the washer 61, which preferably is preformed so as to be of a shape complementary to the space between the surface 67 and the wall 60.

It will be noted that the member 66 is functionally integral with the ring 57 and may be formed integrally therewith. However, in the manufacture of seal assemblies, it is desirable to provide support rings which might be usable either in an assembly such as the assembly 34 or the assembly of Figure 3, and hence it is desirable to use a separate member 66.

It will be understood that modifications and variations may be effected without departing from the spirit and scope of the novel concepts of the present invention.

I claim as my invention:

1. In a seal assembly for effecting a seal between a pair of relatively rotatable elements, a cylindrical wall adapted to be carried by one of the elements, a support ring surrounding said wall, a sealing washer between said support ring and the outer surface of said cylindrical wall, a sealing ring carried by said support ring to project forwardly therefrom and having a sealing face arranged to engage a like face on the other of the relatively rotatable elements, said sealing ring at its forward end having an integral radially inwardly extending annular flange portion having an inner diameter less than the diameter of said outer surface of said cylindrical wall to provide a surface acted upon by fluid under pressure to urge the sealing faces into pressure engagement.

2. In a shaft seal or the like for effecting a seal between a pair of relatively rotatable elements, a first member adapted to be carried by one of the relatively rotatable elements, a second member supported for axial movement relative to said first member, means on said second member defining a sealing face arranged to coact with a sealing face on the other of the relatively rotatable elements, means defining a radially outwardly facing annular surface portion on one of said members, means defining a radially inwardly facing annular surface portion on the other of said members in spaced facing relation to said radially outwardly facing surface portion, a rigid ring having an axially facing annular surface facing in the same direction as said sealing face on said second member, means on said second member defining an axially facing annular surface facing said axially facing surface of said ring, a resilient sealing washer confined between said radially inwardly and outwardly facing surfaces and between said axially facing surfaces, resilient means acting between said first member and said ring for urging the sealing faces into pressure engagement and exerting squeezing forces on said washer, and means on said second member for limiting movement of said rigid ring away from said axially facing annular surface of said second member.

3. In a shaft seal or the like for effecting a seal between a pair of relatively rotatable elements, a support member arranged to be carried by one of the relatively rotatable elements and having inner and outer cylindrical walls and a radially extending annular wall between adjacent ends of said cylindrical walls, a ring between said cylindrical walls and having a radially extending annular face in facing relation to said annular wall, means on said ring defining a sealing face arranged to coact with a sealing face on the other of the relatively rotatable elements, a rigid washer between said radially extending annular wall and said radially extending annular face, a resilient sealing washer between said rigid washer and said radially extending annular face, compression spring means between said rigid washer and said radially extending annular wall, and means on said ring for limiting movement of said rigid washer away from said radially extending annular face.

4. In a shaft seal or the like for effecting a seal between a pair of relatively rotatable elements, a support member arranged to be carried by one of the relatively rotatable elements and having inner and outer cylindrical walls and a radially extending annular wall between adjacent ends of said cylindrical walls, a ring between said cylindrical walls and having a radially extending annular face in facing relation to said annular wall, means on said ring defining a sealing face arranged to coact with a sealing face on the other of the relatively rotatable elements, a rigid washer between said radially extending annular wall and said radially extending annular face, a resilient sealing washer between said rigid washer and said radially extending annular face, compression spring means between said rigid washer and said radially extending annular wall, and an annular flange on said ring for limiting movement of said rigid washer away from said radially extending annular face.

5. In a seal assembly for effecting a seal between a pair of relatively rotatable elements, a generally cylindrical wall adapted to be carried by one of the elements, a support ring surrounding said wall, a sealing ring carried by said support ring to project forwardly therefrom and having a sealing face arranged to engage a like face on the other of the relatively rotatable elements, said sealing ring at its forward end having an integral radially inwardly extending annular flange portion having an inner diameter less than the diameter of said outer surface of said cylindrical wall to provide a surface acted upon by fluid under pressure to urge the sealing faces into pressure engagement, said support ring having an inner surface in facing relation to the outer surface of said cylindrical wall, a rigid ring between said inner and outer surfaces and having a pair of surfaces in convergent relation to said inner and outer surfaces, a resilient sealing washer between said surfaces of said rigid ring and said inner and outer surfaces, and resilient means acting on said ring to exert wedging forces on said sealing washer.

6. In a seal assembly for effecting a seal between a pair of relatively rotatable elements, a generally cylindrical wall adapted to be carried by one of the elements, a support ring surrounding said wall, a sealing ring carried by said support ring to project forwardly therefrom and having a sealing face arranged to engage a like face on the other of the relatively rotatable elements, said sealing ring at its forward end having an integral radially inwardly extending annular flange portion having an inner diameter less than the diameter of said outer surface of said cylindrical wall to provide a surface acted upon by fluid under pressure to urge the sealing faces into pressure engagement, means defining an inner surface on said support ring in facing convergent relation to the outer surface of said cylindrical wall, a resilient sealing washer between said inner and outer surfaces, and means for exerting axial forces on said washer for wedging the same tightly against said convergently related surfaces.

7. In a seal assembly for effecting a seal between a pair of relatively rotatable elements, a generally cylindrical wall adapted to be carried by one of the elements, a support ring surrounding said wall, a sealing ring carried by said support ring to project forwardly therefrom and having a sealing face arranged to engage a like face on the other of the relatively rotatable elements, said sealing ring at its forward end having an integral radially inwardly extending annular flange portion having an inner diameter less than the diameter of said outer surface of said cylindrical wall to provide a surface acted upon by fluid under pressure to urge the sealing faces into pressure engagement, said support ring having an inner surface portion in facing relation to an outer surface portion of said generally cylindrical wall, an annular washer of resilient material between said surface portions, a rigid washer having at least one annular surface portion in engagement with said washer of resilient material, and resilient means acting on said rigid washer for exerting axial compressive forces on the washer of resilient material and urging the sealing faces into pressure engagement, at least two of said surface portions being convergently related to wedge said annular resilient washer into tight pressure engagement with said inwardly and outwardly facing surface portions.

References Cited in the file of this patent

UNITED STATES PATENTS

| | | |
|---|---|---|
| 2,321,871 | Stevenson | June 15, 1943 |
| 2,365,046 | Bottomley | Dec. 12, 1944 |
| 2,419,588 | Pasco | Apr. 29, 1947 |

FOREIGN PATENTS

| | | |
|---|---|---|
| 461,446 | Germany | June 22, 1928 |